(No Model.)
E. H. ROGERS, Jr.
COMBINED LIQUID MEASURE AND REGISTER FOR BOTTLES.
No. 298,778. Patented May 20, 1884.
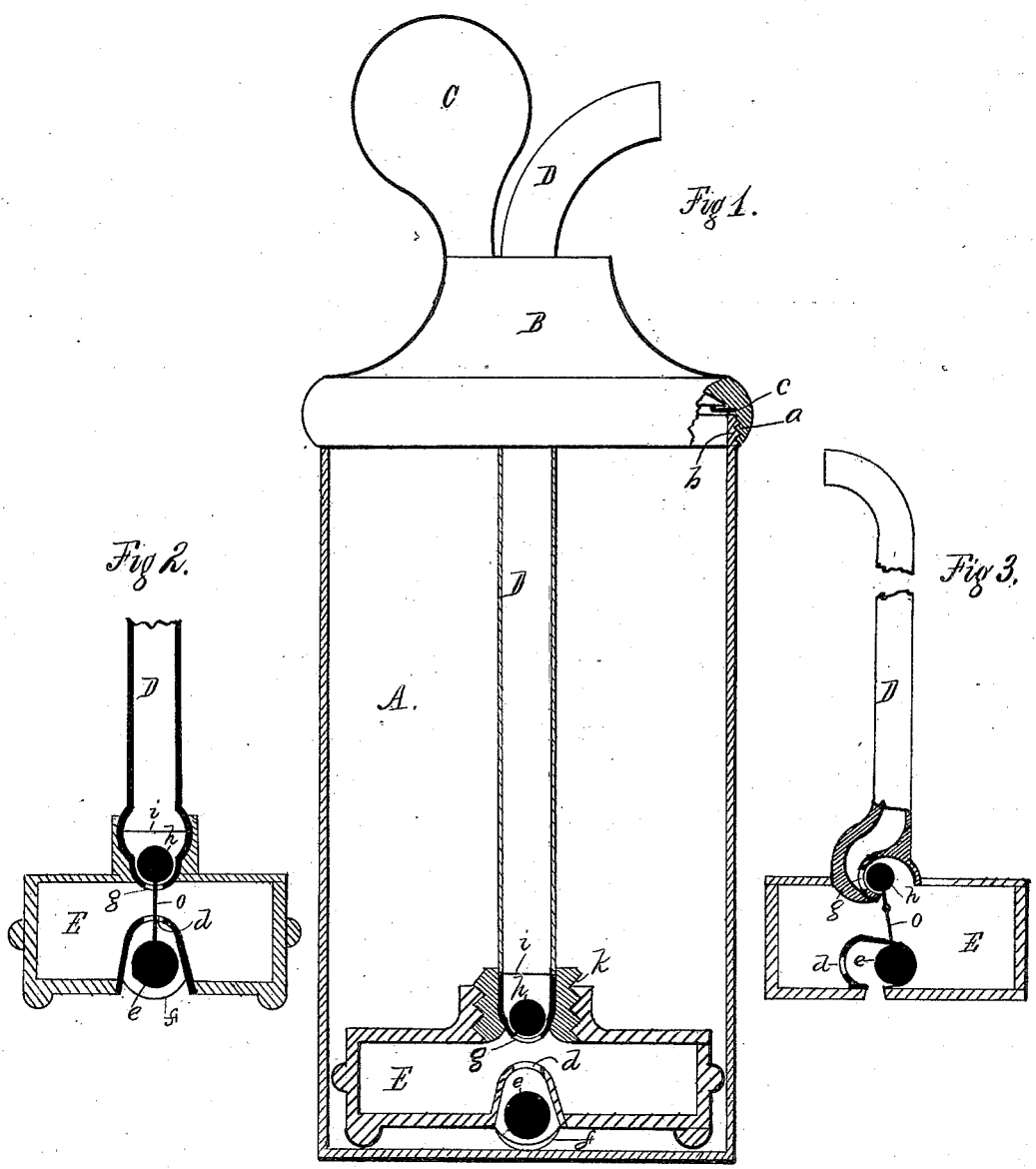

UNITED STATES PATENT OFFICE.

EBENEZER H. ROGERS, JR., OF NEW YORK, N. Y.

COMBINED LIQUID MEASURE AND REGISTER FOR BOTTLES.

SPECIFICATION forming part of Letters Patent No. 298,778, dated May 20, 1884.

Application filed February 29, 1884. (No model.)

*To all whom it may concern:*

Be it known that I, EBENEZER H. ROGERS, Jr., a citizen of the United States, residing in the city, county, and State of New York, have invented certain new and useful Improvements in Combined Liquid Measure and Register for Bottles, of which the following is a specification.

This invention relates to that class of devices arranged to be applied to bottles from which it is desired to dispense fluids in ascertained quantities, and also at the same time to definitely register each and every time a quantity is withdrawn from the bottle. In the present instance I provide a measuring apparatus which is inserted in the base of the bottle, such apparatus having a pouring-spout and provided with valves which, in their normal position, when the bottle is upright, serve to admit the fluid into the measure, and when the bottle is inverted close the inlet-valve, open an outlet-valve, and permit the fluid in the measure to flow therefrom into the pouring-spout. In connection with this measure I also attach a registering device for counting and indicating the exact number of times fluid is withdrawn from the bottle. For this purpose I make use of the bottle-register for which I applied for Letters Patent on December 27, 1883, although any other suitable registering device may be used; all of which, together with the details of construction and operation, will be hereinafter fully pointed out and described.

In the drawings, which form an essential part of this specification, Figure 1 represents an elevation, partially in section, of a bottle or apparatus in which my invention is fully embodied; and Figs. 2 and 3 are modifications of the same.

The same letters of reference marked on the various figures of the drawings will locate and point out corresponding parts.

The object I have sought to attain in the present invention is to produce an accurate system of measuring the quantities of the fluid drawn from the bottle, to prevent the quantities from being varied, and also at the same time to accurately register upon an indicating-dial the exact number of times the measured quantities are withdrawn from the bottle.

Incidental to my invention I have also devised a form of bottle particularly adapted for the application of my improved devices for measuring and registering.

A designates the body of the bottle. Its shape may be varied in many ways.

B is the bottle-top, which is formed from metal, and is secured to the top of the bottle by means of the screw $a$, the bottle-body also being provided with screw-threads $b$, corresponding thereto. A suitable packing-ring, $c$, is interposed between the two, and the bottle and its metal top may be secured together by means of staples and a lock, or by any other approved locking device.

C is the registering apparatus, mounted upon the top of the bottle-top, and in construction and operation is as is fully described and claimed in my application for Letters Patent filed December 27, 1883, and a further detailed description is not herein called for. The pouring-spout D passes through the center of the bottle-top B, and is firmly secured therein. The measuring apparatus E is of nearly the same diameter of the interior of the bottle, and rests upon the bottom thereof, as shown. It is formed from metal, and in its base, at the center, is provided with a valve, $d$, which in form is that of a half-sphere, a bulb, $e$, being fitted to operate thereon, and is prevented from escaping by means of a wire cage, $f$. The bottom of the pouring-spout D is provided with a valve-ball, $h$, which is limited in its play by means of the stop-wires $i$. The spout D is secured to the measuring-vessel E by means of a bushing and screw, $k$, or by means of any other method preferred by the skilled mechanic constructing the apparatus.

The operation of the combined devices is as follows, the normal state of the apparatus being as shown in Fig. 1: The bottle having first been filled with liquid, the body and top being locked together, the valve-ball $e$, by its own weight, drops down upon the wire cage $f$. The liquid then flows freely by the ball through the valve $d$, and of course fills the measure E. The upper valve-ball, $h$, by its weight, closes the valve $g$ and prevents any fluid from escaping from the measure into the spout D. The bottle is now inverted, and the valve-balls $h$ and $e$ instantly reverse their positions. The valve $g$ being open, the liquid in the measure E of course instantly flows through the spout D, the valve-ball e closing the valve d and preventing any of the balance of the contents of the bottle from escaping. At the instant the bottle is tipped or reversed the register C counts one, as described in my aforesaid application for Letters Patent. The bottle is now returned to its first position, and the operation is repeated until its contents are exhausted.

It is obvious that the measuring apparatus may be used entirely distinct from the counting device.

In Fig. 2 I have shown the two valve-balls as united by means of a rod, o. This system may be used to insure unity of action. In Fig. 3 I have shown them as hung for operation in the manner of a pendulum.

Other similar arrangements may be used; but they are but variations of the device as shown in Fig. 1.

I claim as my invention—

1. The combination of a bottle or similar vessel, a fluid-measure inserted in the base thereof, provided with operating-valves and a spout for filling and discharging the same, and a registering device mounted upon the bottle-top, for indicating the number of times the measure is filled and discharged, all applied and operating in the manner substantially as herein shown and set forth.

2. The combination of a bottle and a measuring device inserted in the base thereof, such measure being provided with automatic valves for controlling the entry and discharge of the fluid, and a discharging-spout passing through the bottle-top.

3. The combination of a bottle or similar shaped vessel, a metallic top of the same diameter as the vessel-body, carrying a registering device, a spout for delivering the fluid, a fluid-measure depending from the base of such spout, and a locking device for securing the bottle-body and metallic top together, all substantially as and for the purposes as herein shown and set forth.

4. The fluid-measure E, depending from the spout D, and provided with valves $d\,e$ and $h\,g$, applied and operating substantially as and for the purposes as shown and set forth.

5. The combination of the vessel A, metallic top B, having a register, C, pouring-spout D, and liquid-measure E, all arranged, applied, and operating substantially as and for the purposes as herein shown and set forth.

EBENEZER H. ROGERS, JR.

Witnesses:
   A. L. MUNSON,
   H. D. CLAPP.